(12) United States Patent
Tisch et al.

(10) Patent No.: US 7,066,478 B2
(45) Date of Patent: Jun. 27, 2006

(54) FRONT AXLE OF A MOTOR VEHICLE WITH STEERABLE, DRIVEN OR NOT DRIVEN WHEELS

(75) Inventors: Siegfried Tisch, Gerlingen (DE); Johann Hamperl, Esslingen (DE)

(73) Assignees: INA-Schaeffler KG, Herzogenaurach (DE); DaimlerChrysler AG, Stuttgart (DE)

(\*) Notice: Subject to any disclaimer, the term of this patent is extended or adjusted under 35 U.S.C. 154(b) by 357 days.

(21) Appl. No.: 10/254,821

(22) Filed: Sep. 25, 2002

(65) Prior Publication Data

US 2003/0075892 A1 Apr. 24, 2003

(30) Foreign Application Priority Data

Oct. 11, 2001 (DE) .......................... 101 50 228

(51) Int. Cl.
 *B62D 7/18* (2006.01)

(52) U.S. Cl. .................................. 280/93.512
(58) Field of Classification Search ............ 280/93.511, 280/93.512
See application file for complete search history.

(56) References Cited

U.S. PATENT DOCUMENTS

| | | | | | |
|---|---|---|---|---|---|
| 3,659,869 | A | * | 5/1972 | Hase et al. | 280/93.512 |
| 4,043,567 | A | * | 8/1977 | Kaiser | 280/93.512 |
| 4,798,394 | A | * | 1/1989 | Pollock et al. | 280/93.512 |
| 5,975,547 | A | * | 11/1999 | Stroh et al. | 280/93.512 |
| 6,113,118 | A | * | 9/2000 | Zebolsky | 280/93.512 |

FOREIGN PATENT DOCUMENTS

| | | |
|---|---|---|
| DE | 37 32 684 | 4/1988 |
| DE | 43 14 720 | 11/1994 |
| DE | 197 38 114 | 3/1999 |
| DE | 199 46 483 | 4/2000 |
| DE | 199 55 509 | 5/2001 |

\* cited by examiner

*Primary Examiner*—Faye M. Fleming
(74) *Attorney, Agent, or Firm*—Jordan and Hamburg LLP

(57) ABSTRACT

A front axle of a motor vehicle with steerable, driven or non-driven wheels on steering knuckles pivotably hinged at a wheel-guiding element with an upper and a lower bearing position, each of which accommodates a radial bearing for mounting a steering knuckle bolt with a pot-shaped sleeve with a sealed lubricant reservoir and forms a bearing bushing. A stop disk is arranged a bottom of the sleeve to absorb axial forces and roll bodies of the radial bearing are supported with the supporting surfaces at the stop disk.

21 Claims, 2 Drawing Sheets

FRONT AXLE OF A MOTOR VEHICLE WITH STEERABLE, DRIVEN OR NOT DRIVEN WHEELS

FIELD OF THE INVENTION

The invention relates to a front axle of a motor vehicle with steerable, driven or non-driven wheels on steering knuckles, which have been pivotably hinged at a wheel-guiding element with an upper and a lower bearing position, each of which accommodates a radial bearing for mounting a steering knuckle bolt with a pot-shaped sleeve having a sealed lubricant reservoir and forming a bearing bushing.

The invention also relates to a bearing bushing for a steering knuckle mounting with a pot-shaped sleeve with a sealed lubricant reservoir, accommodating a radial bearing.

BACKGROUND OF THE INVENTION

Front axles of the foregoing type are used in all-terrain vehicles, SUVs (Sport Utility Vehicles), light to heavy commercial vehicles and buses. The joint connection between the steering knuckle and the wheel-guiding element, such as a rigid axle body or a guide of a single wheel suspension, in known constructions may be a king pin with two bearing sites or two separate steering knuckle bolts. Generally, needle bearings and needle bushings are used as a radial mounting. Axial forces are absorbed by a separate axial friction bearing or axial roller bearing. However, this bearing requires a particularly reliable seal and this has turned out to be a weakness in practice. The bearing must be lubricated at regular intervals in order to force dirt, water and wear debris out of the mounting and to supply the bearing parts with fresh lubricating grease. If the seal fails, a danger exists in that the bearing will become unusable after a short time.

There have also already been attempts to make steering knuckle bolt mountings which do not require maintenance. For this purpose, relatively long and thin needle bearings are used, which produce high edge compressions under load. All known constructions furthermore have the disadvantage that different components are required for the upper and lower bearing sites.

SUMMARY OF THE INVENTION

It is therefore an object of the invention to avoid the disadvantages mentioned above and to create a front axle with a reliably sealed steering knuckle mounting.

Pursuant to the invention, this objective is accomplished by a front axle including a pot-shaped sleeve and a stop disk arranged at the bottom of the pot-shaped sleeve. The stop disk absorbs axial forces and supports roll bodies of the radial bearing along their supporting surfaces. The stop disk is in a position to support the roll bodies of the radial bearing at the front. A disk spring may be placed on the opposite front surface of the roll bodies so that a constant axial force presses the roll bodies against the stop disk and aligns it parallel to the axis.

In the front axle in accordance with the invention, a separate axial bearing may be omitted and the axial forces which arise may be transferred instead directly over the stop disk to the steering knuckle bolt.

Pursuant to the invention, the roll bodies may be shorter and have a larger diameter than known mountings so that high radial loads can be absorbed more elastically and reliably prevent distortion of the roll bodies.

The front axle in accordance with the invention has the advantage that, because of the absence of an axial bearing, the upper and lower bearing sites can be constructed identically. This leads to a corresponding reduction in the diversity of the components and to economic batch sizes.

The properties of the friction bearing are particularly advantages if the stop disk has a coating of polyvinylidene fluoride (PVDF) or consists thereof. This material enables relatively high forces to be transferred by the roller supporting surfaces and has excellent long-term behavior.

In a further development of the invention, the lubricant reservoir can alternatively be filled with grease or oil. In both cases, it is filled by the manufacturer for the lifetime of the reservoir so that the front axle is practically maintenance free. Preferably, it is filled with oil, from which a longer lifetime can be expected and which is more effective than grease. Nevertheless, the mounting of the front axle is constructed so that the supply lubricant, if necessary, can be controlled and supplemented.

Pursuant to the invention, the bushing may have a sealing unit which seals the mounting and preferably comprises a spring-loaded sealing element. The bearing is enclosed by the sealing unit so that dirt particles cannot penetrate into it from outside. It is well known that, in the course of time, seals are subjected to wear caused by relative movements. However, because the sealing element is spring-loaded, a substantially constant contacting force of the sealing element can be achieved so that the sealing unit seals reliably even after a prolonged period of use. Radial shaft sealing rings are suitable especially when the lubricant reservoir is filled with oil. A seal with several lips can also be used, for reasons of costs, when the reservoir is filled with grease.

To facilitate the installation of the front axle, the bushing can be preassembled with the radial bearing and the sealing unit. The bearing bushing can also be produced as a compact unit, ready to be installed, so that the installation, the maintenance, the costs as well as the reliability of the mounting of the front axle are improved.

The object of the invention is also accomplished by a bearing bushing in which, at the bottom of the pot-shaped bushing, a stop disk is arranged to absorb axial forces and at the front side of which, the roll bodies of the radial bearing are supported. A disk spring, which is preferably spring-loaded, may be placed on the roll bodies.

The stop disk may be is coated with a friction bearing material, preferably with polyvinylidene fluoride (PVDF), or consists thereof. When the coating is lubricated slightly, it enables high forces to be transferred and ensures reliable operation in the long run.

The bearing bushing in accordance with the invention can be filled during its production or installation with grease or oil for lifetime of the unit. The invention offers the possibility of filling the bushing with grease or oil, depending on the intended use, so that the area of application of the bearing bushing is exceptionally large without requiring any changes in the components.

It has proven to be especially advantageous to use a spring-loaded sealing element, especially a radial shaft seal, as sealing unit. If there is abrasive wear, the seal is continuously adjusted automatically so that it does not leak, even after a prolonged period of use. This is the case particularly also for swiveling motions and when centrifugal forces occur.

Further advantages and details of the invention arise out of the description of a particularly suitable example and from the accompanying drawings.

DESCRIPTION OF THE PREFERRED EMBODIMENTS

Figure 1:
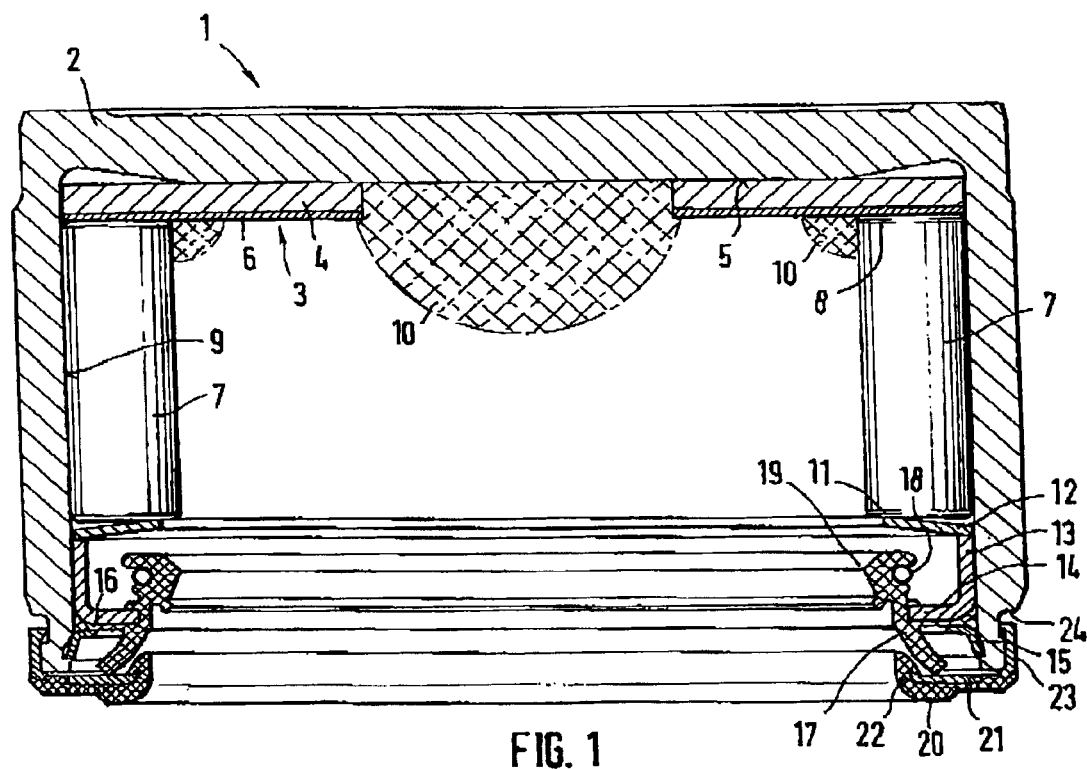
FIG. 1 shows an inventive bearing bushing in a sectional view.

The bearing bushing 1, shown in section in FIG. 1, consists of a one-part pot-shaped sleeve 2 which is produced preferably by deep drawing. A stop disk 3 is inserted into the sleeve 2 and has a steel back 4 which lies against an inner bottom 5 of the sleeve 2. At its side opposite to the bottom 5 of the sleeve 2, the stop disk 3 has a coating 6 of a friction bearing material. In the example shown, a coating 6 of polyvinylidene fluoride (PVDF) is applied.

The steering knuckle mounting has a plurality of roll-shaped bodies 7, which are produced from roller-bearing steel and are supported with their lateral roll bearing surfaces 8 on the PVDF coating 6 of the stop disk 3. The bearing bushing 1 contains a total of 23 roller bodies 7, which are inserted between the inside 9 of the sleeve 2 and the outside of a steering knuckle bolt which is inserted in the bearing bushing 1 and not shown in FIG. 1.

A lubricant 10 is applied at several places in the region of the stop disk 3 and the roll bodies 7.

A disk spring 12 is fixed by a holding ring 13 having an inwardly 90° offset collar 14 so that the disk spring 12 is subjected at least to a small prestressing force and the roll body 7 presses with approximately constant force against the coating 6 even if wear occurs. The disk spring 12 acts on the roll supporting surface 11 which is opposite the roll supporting surface 8. A clamping section of a sealing ring 17 is clamped between the collar 14 of the holding ring 13, which is offset 90° to the inside, and a locking ring 15, which is produced from a spring steel. The sealing ring 17 is produced from an elastomer which may be an acrylonitrile/butadiene elastomer. The sealing ring 17 is constructed as a radial shaft sealing ring and has a peripheral steel reinforcing ring 18. This reinforcing ring 18 exerts a radial pretension on this section of the sealing ring 17 so that, in the installed state, an inner, protruding sealing edge 19 of the sealing ring 17 lies radially entirely against the inserted steering knuckle bolt and the interior of the bearing bushing 1 is sealed completely.

The sleeve 2 is also sealed by a sealing ring 20 which has an approximately U-shaped cross section and which is offset twice by 90°. In the interior of the sealing ring 20, there is a corrosion-protected, sheet steel reinforcement 21 which is coated by an elastomer 22 in the region of the sleeve opening. An outer section 23 of the steel reinforcement 21, which extends parallel to the longitudinal side of the sleeve 2, is bent towards the inside at its end and engages a peripheral groove 24 of the sleeve 2. In the installed state, the steering knuckle bolt is in contact with the surface of the sealing ring 20 having the coating 22 of elastomer, as well as with the sealing edge 19 of the sealing ring 17.

Figure 2:
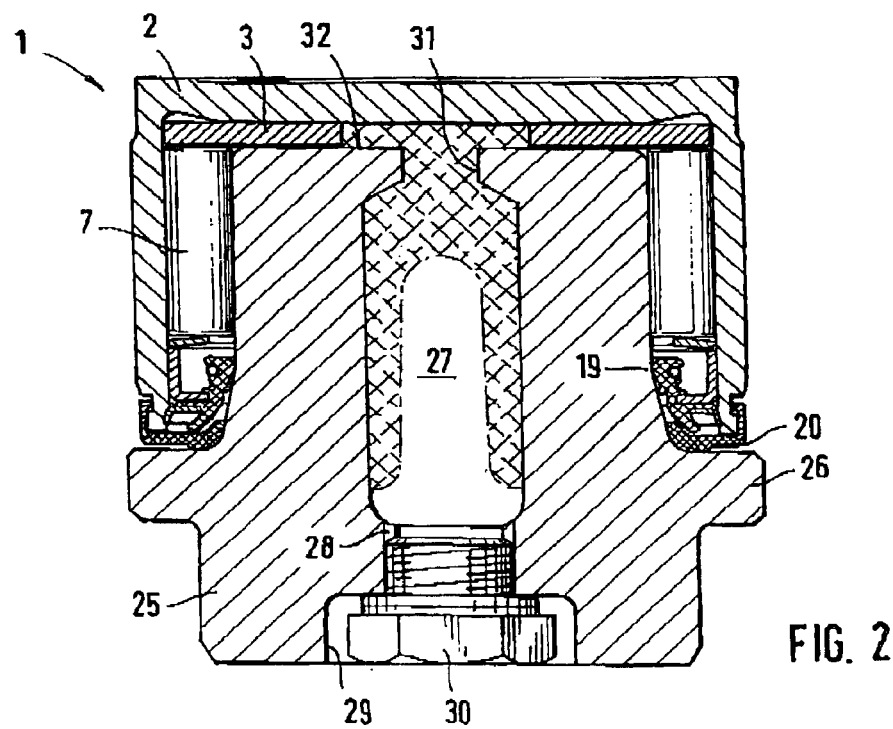
FIG. 2 shows an inventive bearing bushing with an inserted steering knuckle bolt in a sectional view.

FIG. 2 shows the bearing bushing 1 of FIG. 1 with an inserted steering knuckle bolt 25 in a sectional view. The steering knuckle bolt 25 has a peripheral collar 26 which protrudes on the outside and lies axially against the sealing ring 20. The sealing edge 19, which lies laterally against the steering knuckle bolt 25, is also sealed radially. As can be seen in FIG. 2, the steering knuckle bolt 25 has a radially symmetrical cavity 27, a threaded borehole 28 adjoining on one side of the cavity 27 and a radial recess 29 which forms a contacting surface for a plug 30 sealing the cavity 27. The cavity 27 serves as a lubricant reservoir which can be filled with oil as well as grease. The side of the cavity 27 opposite the plug 30 tapers conically. Adjoining this conically tapering side, there is an opening 31 so that the lubricant, accommodated in the cavity 27, can reach the region of the bearing bushing 1 between the stop disk 3 and the roller bodies 7.

The steering knuckle mounting, shown in FIG. 2, is enclosed completely so that a single filling with grease or oil suffices for its entire service life. Due to the relative motions between the steering knuckle bolt 25, the roll bodies 7 and the sleeve 2 with the stop disk 3, the lubricating medium is distributed automatically without requiring any control or refilling within the scope of maintenance. During the installation, the sealing lips and the sealing ring interstices of the sealing ring 17, 20 are greased in order to avoid penetration of dust, dirt or moisture into this region.

Aside from the radial forces which are absorbed by the mounting, there are also axial forces. These axial forces are passed over the sleeve bottom 5, the stop disk 3 and the steering knuckle bolt 25. An additional, separate axial bearing is therefore not required.

Figure 3:
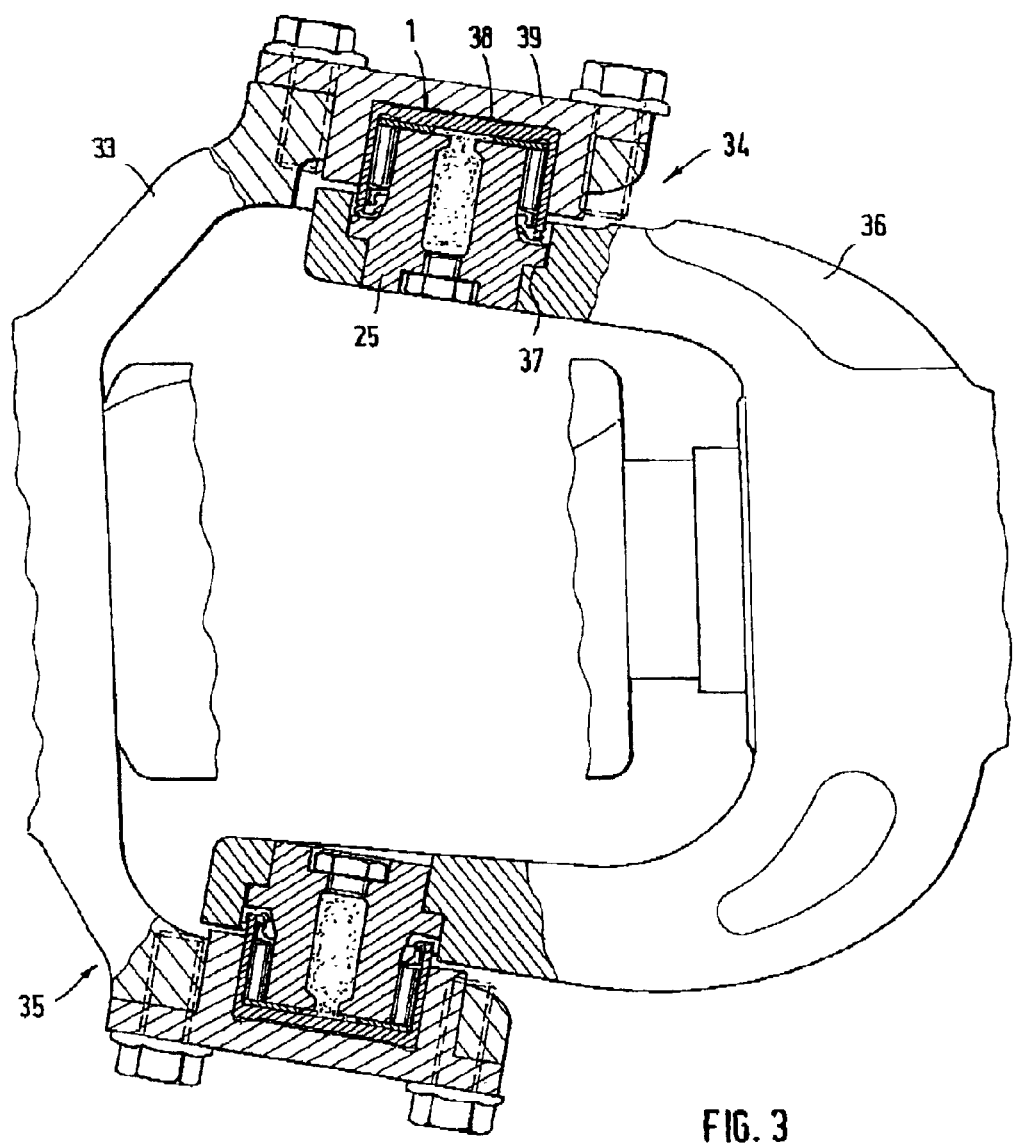
FIG. 3 shows the steering knuckle bolt mounting of an inventive front axle in a partially sectional side view.

FIG. 3 shows the steering knuckle bolt mounting of a front axle in a partially sectional side view. The steerable wheels, which are not shown, are supported in each case at a steering knuckle 33 which is divided fork-like in the region of the bearing. The steering knuckle 33 is pivotally mounted at an upper bearing site 34 and a lower bearing site 35 at a rigid axle housing 36 which is divided fork-like in the bearing area.

The upper bearing site 34 and the lower bearing site 35 each have a bushing 1 with an inserted steering knuckle bolt 25. The two bearing sites 34, 35, are symmetrical. The steering knuckle bolts 25 are pressed in each case into appropriate, mirror-image bearing seats 37 of the axle housing 36. Similarly, the bearing bushing 1 is pushed into a bearing seat 38 of a holding device 39 fastened to the steering knuckle 33.

What is claimed is:

1. A front axle of a motor vehicle with steerable, driven or non-driven wheels on steering knuckles, which have been pivotably hinged at a wheel-guiding element with an upper and a lower bearing position, each of which with a pot-shaped sleeve with a sealed lubricant reservoir, accommodating a radial bearing for mounting a steering knuckle bolt and forming a bearing bushing, wherein the radial bearing includes a plurality of roll bodies arranged in an interior of the sleeve, a stop disk which absorbs axial forces is arranged at a bottom of the sleeve, the roll bodies including first supporting surfaces and being supported with the first supporting surfaces on the stop disk, the roll bodies also including second supporting surfaces opposite to the first supporting surfaces, and further comprising a pre-stressed disk spring placed on the second supporting surfaces of the roll bodies.

2. A bearing bushing for a steering knuckle mounting with a pot-shaped sleeve, accommodating a radial bearing and with a sealed lubricant reservoir, wherein the radial bearing includes a plurality of roll bodies arranged in an interior of the sleeve, and a stop disk is arranged at a bottom of the sleeve to absorb axial forces, the roll bodies including first supporting surfaces and being supported with the first supporting surfaces on the stop disk.

3. The bearing bushing of claim 2, wherein the stop disk has a coating of polyvinylidene fluoride (PVDF).

4. The bearing bushing of claim 2, wherein the lubricant reservoir includes grease or oil.

5. The bearing bushing of claim 2, wherein the roll bodies include second supporting surfaces opposite to the first supporting surfaces, further comprising a pre-tensioned disk spring placed on the second supporting surfaces of the roll bodies.

6. The bearing bushing of claim 2, wherein the bushing includes a sealing unit.

7. The bearing bushing of claim 6, wherein the sealing unit comprises a spring-loaded sealing element.

8. The bushing bearing of claim 7, wherein the sealing element comprises a radial-shaft sealing ring.

9. The bearing bushing of claim 6, wherein the bushing is pre-assembled with the radial bearing and the sealing unit.

10. The bearing bushing of claim 2, wherein the bushing is maintenance-free.

11. The bearing bushing of claim 2, wherein the radial bearing is constructed in one or two rows.

12. A bearing bushing for mounting a steering knuckle bolt, comprising:
   a pot-shaped sleeve having an interior and a sealed lubricant reservoir;
   a plurality of roll-shaped bodies arranged in said interior of said sleeve and adapted to be positioned between the knuckle bolt and an inside surface of said sleeve; and
   a stop disk arranged at a bottom of said sleeve to absorb axial forces, said roll-shaped bodies including first supporting surfaces in contact with said stop disk.

13. The bearing bushing of claim 12, wherein said stop disk includes a coating of a friction bearing material, said roll-shaped bodies being in contact with said coating.

14. The bearing bushing of claim 12, wherein said roll-shaped bodies include second supporting surfaces opposite to said first supporting surfaces, further comprising a pre-tensioned disk spring engaging with said second supporting surfaces of said roll-shaped bodies.

15. The bearing bushing of claim 14, further comprising a holding ring arranged in said sleeve for fixing said disk spring.

16. The bearing bushing of claim 12, further comprising a sealing unit for sealing said sleeve to the knuckle bolt.

17. The bearing bushing of claim 16, wherein said sealing unit comprises a spring-loaded sealing element.

18. The bushing bearing of claim 17, wherein said sealing element is a radial-shaft sealing ring.

19. A front axle of a motor vehicle with steerable, driven or non-driven wheels on steering knuckles, which have been pivotably hinged at a wheel-guiding element with an upper and a lower bearing position, each of which with a pot-shaped sleeve with a sealed lubricant reservoir, accommodating a radial bearing for mounting a steering knuckle bolt and forming a bearing bushing, wherein
   the bushing includes a sealing unit which seals the mounting,
   the sealing unit comprising a spring-stressed sealing element,
   the radial bearing includes a plurality of roll bodies arranged in an interior of the sleeve, and
   a stop disk which absorbs axial forces is arranged at a bottom of the sleeve, the roll bodies including first supporting surfaces and being supported with the first supporting surface son the stop disk.

20. The front axle of claim 19, wherein the sealing element comprises a radial-shaft sealing ring.

21. A front axle of a motor vehicle with steerable, driven or non-driven wheels on steering knuckles, which have been pivotably hinged at a wheel-guiding element with an upper and a lower bearing position, each of which with a pot-shaped sleeve with a sealed lubricant reservoir, accommodating a radial bearing for mounting a steering knuckle bolt and forming a bearing bushing, wherein
   the radial bearing includes a plurality of roll bodies arranged in an interior of the sleeve, and
   a stop disk which absorbs axial forces is arranged at a bottom of the sleeve, the stop disk having a coating of polyvinylidene fluoride (PVDF), the roll bodies including first supporting surfaces and being supported with the first supporting surface son the stop disk.

* * * * *